US 9,517,638 B2

(12) United States Patent
Otoguro et al.

(10) Patent No.: US 9,517,638 B2
(45) Date of Patent: Dec. 13, 2016

(54) LIGHT SCANNING APPARATUS AND IMAGE FORMING APPARATUS

(71) Applicant: CANON KABUSHIKI KAISHA, Tokyo (JP)

(72) Inventors: Yasuaki Otoguro, Abiko (JP); Takehiro Ishidate, Tokyo (JP); Yuichiro Imai, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/989,467

(22) Filed: Jan. 6, 2016

(65) Prior Publication Data

US 2016/0207328 A1 Jul. 21, 2016

(30) Foreign Application Priority Data

Jan. 19, 2015 (JP) .................................. 2015-007737

(51) Int. Cl.
| | |
|---|---|
| *G02B 26/08* | (2006.01) |
| *G02B 26/12* | (2006.01) |
| *B41J 2/47* | (2006.01) |
| *G02B 27/00* | (2006.01) |

(52) U.S. Cl.
CPC ............ *B41J 2/471* (2013.01); *G02B 27/0006* (2013.01)

(58) Field of Classification Search
CPC ............ G03G 15/0435; G03G 15/4036; G03G 21/1666; G03G 15/04045; G03G 15/04; G03G 21/1623; G03G 2221/1678; G03G 21/1619; G03G 15/04036; G03G 13/04; G03G 15/043; G03G 15/80; G02B 26/125; G02B 27/0006; G02B 26/08; G02B 26/12; B41J 2/385; B41J 2/47

See application file for complete search history.

(56) References Cited

U.S. PATENT DOCUMENTS

| | | | |
|---|---|---|---|
| 7,522,326 B1 | 4/2009 | Otoguro | ........................ 359/216 |
| 7,684,099 B2 | 3/2010 | Otoguro | ..................... 359/216.1 |

(Continued)

FOREIGN PATENT DOCUMENTS

JP          09-26553          1/1997

OTHER PUBLICATIONS

U.S. Appl. No. 15/000,854, filed Jan. 19, 2016; Inventors: Takehiro Ishidate, Genichiro Kudo.

*Primary Examiner* — Thinh Nguyen

(74) *Attorney, Agent, or Firm* — Fitzpatrick, Cella, Harper & Scinto

(57) ABSTRACT

A light scanning apparatus, including: an optical box configured to hold a deflector and an optical member; and a cover, the optical box including: a concave-shaped cut-away portion formed from a top portion of a side wall toward a bottom portion; and a connecting wall which stands from the bottom portion of the optical box and is bent and branched from the cut-away portion to an inside of the optical box so as to cross over the cut-away portion, the cover including a dustproof member sandwiched between the cover and the side wall and between the cover and the connecting wall which a cable passes, wherein a height of a distal end of the connecting wall, which the cable passes, from the bottom portion is larger than a height of a base portion of the cut-away portion from the bottom portion.

20 Claims, 9 Drawing Sheets

(56) References Cited

U.S. PATENT DOCUMENTS

| | | | |
|---|---|---|---|
| 8,456,723 B2 * | 6/2013 | Shirai | G03G 15/04036 |
| | | | 359/197.1 |
| 8,947,478 B2 | 2/2015 | Ishidate et al. | 347/137 |
| 9,086,645 B2 | 7/2015 | Otoguro et al. | G03G 15/0435 |
| 9,195,063 B2 | 11/2015 | Ishidate et al. | G02B 26/125 |
| 2015/0202886 A1 | 7/2015 | Aruga et al. | B41J 2/47 |
| 2015/0212477 A1 | 7/2015 | Ishidate et al. | G03G 15/80 |
| 2015/0277082 A1 | 10/2015 | Otoguro et al. | G02B 7/181 |
| 2015/0293350 A1 | 10/2015 | Sato et al. | G02B 26/129 |

\* cited by examiner

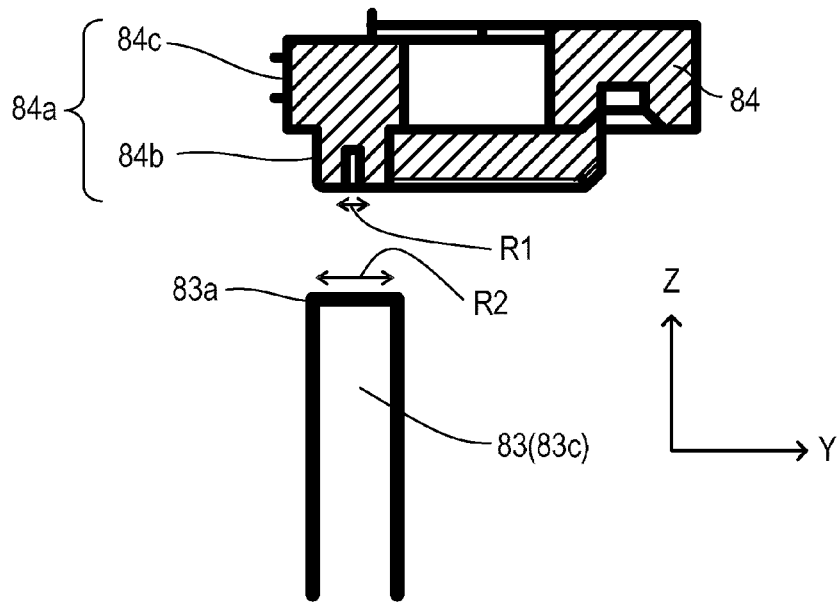
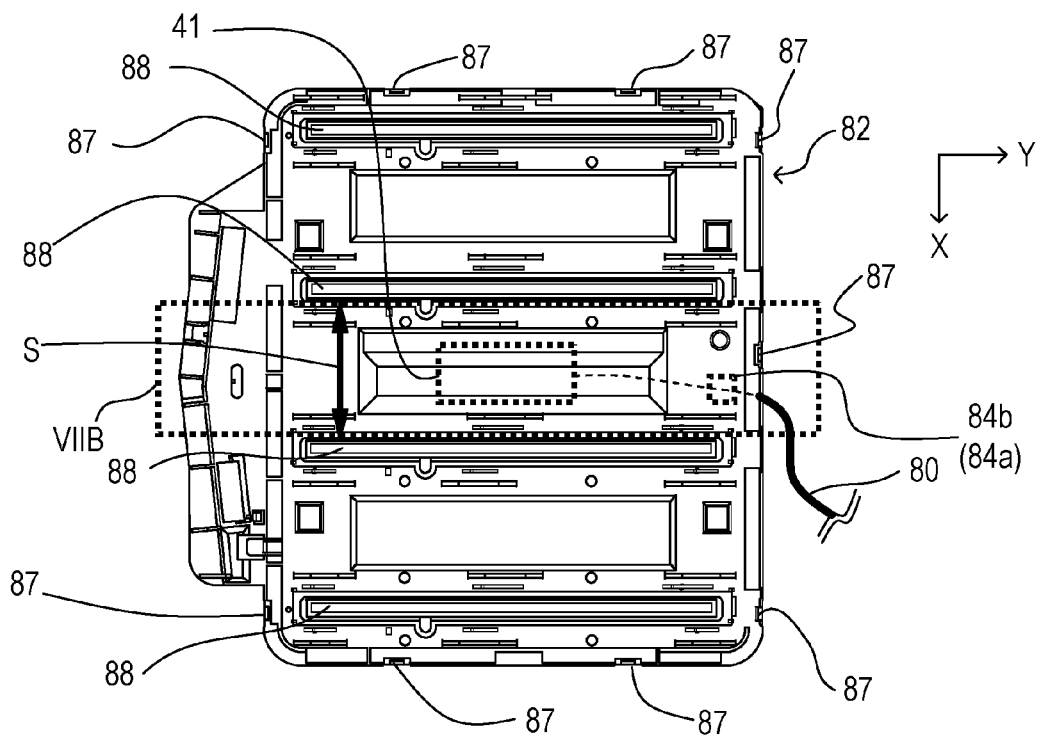

LIGHT SCANNING APPARATUS AND IMAGE FORMING APPARATUS

BACKGROUND OF THE INVENTION

Field of the Invention

The present invention relates to a light scanning apparatus and an image forming apparatus, and more particularly, to a light scanning apparatus to be arranged in an electrophotographic image forming apparatus such as a digital copying machine, a laser beam printer, and a facsimile machine.

Description of the Related Art

A light scanning apparatus to be arranged in an image forming apparatus is configured to form a light spot, which is obtained by converging laser light emitted from a semiconductor laser through an optical element such as a collimator lens and an fθ lens, on a surface of a photosensitive drum which is a scanned surface. The light scanning apparatus includes a deflector such as a rotary polygon mirror configured to deflect the laser light emitted from the semiconductor laser. A desired electrostatic latent image is formed on the surface of the photosensitive drum by scanning the surface of the photosensitive drum with the laser light deflected by the deflector while repeating light emission and stop of the light emission from the semiconductor laser. Through an electric cable, power is supplied to the deflector and operation instruction signals for the rotary polygon mirror are transmitted to and received from the deflector. The electric cable passes through a hole portion or a cut-away portion formed in a casing of the light scanning apparatus or a cover member which is mounted so as to cover an opening portion of the casing, and the electric cable is connected to a control board arranged outside of the light scanning apparatus.

The electric cable passes through the hole portion or the cut-away portion which is the opening portion formed in the casing or the cover member. Therefore, outside air containing dust or dirt is sucked into the light scanning apparatus through the opening portion. Therefore, the dust or dirt contained in the sucked outside air adheres to reflecting surfaces of the rotary polygon mirror or a reflecting surface of a reflecting mirror to contaminate the surfaces thereof. Further, the contamination of a part of the reflecting surface configured to reflect the laser light changes a light quantity of the laser light that successfully reaches the surface of the photosensitive drum which is the scanned surface. Therefore, density unevenness is caused in an output image formed on a sheet to degrade image quality.

The opening portion through which the electric cable is laid is generally formed as small as possible, and therefore the amount of outside air entering the light scanning apparatus through the opening portion is extremely small. However, due to the adhesion of the dust or dirt contained in the outside air onto the reflecting surfaces of the rotary polygon mirror or the reflecting surface of the reflecting mirror, the amount of reflected laser light changes. As a result, because an image which is formed through electrophotography generally reacts sensitively to the change in light amount, the inflow of the outside air through the opening portion cannot be ignored.

Further, in recent years, the light scanning apparatus operates at a higher speed. Therefore, the number of rotations of the rotary polygon mirror is increased to increase a rate of airflow generated around the rotary polygon mirror. As a result, there are generated a positive-pressure portion and a negative-pressure portion inside the light scanning apparatus to increase a suction force for sucking the outside air from outside to inside of the apparatus. Thus, a larger amount of outside air is disadvantageously sucked even through the extremely small opening than before. As described above, due to the contamination of the reflecting surface of the optical component, maintenance work such as replacement of the light scanning apparatus and cleaning of the reflecting surfaces of the rotary polygon mirror increases. Therefore, in order to deal with the above-mentioned problem, the following countermeasure has been taken. Specifically, a soft sealing member such as a foamed member is fitted into the opening portion through which the above-mentioned electric cable passes. For example, in Japanese Patent Application Laid-Open No. H09-26553, a portion of an outer peripheral wall of a casing of a deflection scanning apparatus, through which the electric cable passes, is filled with a foamed member such as Moltoprene so as to prevent the outside air containing dust or dirt from entering the apparatus.

However, cells of the foamed member are continuously linked although linked portions are extremely small. Therefore, the outside air undesirably enters the apparatus through the cells of the foamed member. Therefore, the reflecting surface of the optical component is contaminated with the dust or dirt contained in the entering outside air. Thus, there arises a problem in that satisfactory image forming performance cannot be obtained. Further, for filling of the foamed member, work must be carried out while confirming whether or not the foamed member reliably covers the periphery of the electric cable, resulting in low workability. Further, the foamed member is soft, and therefore, if a shape of the foamed member is warped due to a sliding resistance between the electric cable and the foamed member when the electric cable and the foamed member are accommodated in the cut-away portion of the casing, a clearance is generated. Thus, there also arises a problem in that intended dustproof performance cannot be obtained.

SUMMARY OF THE INVENTION

The present invention has been made under the above-mentioned circumstances, and provides a light scanning apparatus and an image forming apparatus which improves dustproof performance as well as workability.

In order to solve the above-mentioned problems, according to one embodiment of the present invention, there is provided a light scanning apparatus, comprising: a light source configured to emit a light beam; a deflector configured to deflect the light beam emitted from the light source; an optical member configured to guide the deflected light beam to a photosensitive member; an optical box, which the light source is mounted to, configured to hold the deflector and the optical member in an inside of the optical box; and a cover configured to cover an opening of the optical box, the optical box including: a concave-shaped cut-away portion formed from a top portion of a side wall of the optical box toward a bottom portion of the optical box; and a connecting wall which stands from the bottom portion of the optical box and is bent and branched from the concave-shaped cut-away portion of the side wall to the inside of the optical box so as to cross over the concave-shaped cut-away portion, the cover including a dustproof member provided on the cover to dustproof the inside of the optical box, the dustproof member being sandwiched between the cover and the side wall and between the cover and the connecting wall which a cable configured to connect a member arranged inside the optical box and a member arranged outside the optical box passes when the cover is mounted onto the optical box, wherein a height of a distal end of the connecting wall, which the cable passes, from the bottom portion is larger than a height of a base portion of the concave-shaped cut-away portion from the bottom portion.

According to one embodiment of the present invention, there is provided an image forming apparatus, comprising: a photosensitive member; a light scanning apparatus configured to emit a light beam so that the light beam scans the photosensitive member to form an electrostatic latent image on the photosensitive member; a developing unit configured to develop the electrostatic latent image formed by the light scanning apparatus to form a toner image; and a transfer unit configured to transfer the toner image formed by the developing unit onto a recording medium, the light scanning apparatus including: a light source configured to emit the light beam; a deflector configured to deflect the light beam emitted from the light source; an optical member configured to guide the deflected light beam to the photosensitive member; an optical box, which the light source is mounted to, configured to hold the deflector and the optical member in an inside of the optical box; and a cover configured to cover an opening of the optical box, the optical box including: a concave-shaped cut-away portion formed from a top portion of a side wall of the optical box toward a bottom portion of the optical box; and a connecting wall which stands from the bottom portion of the optical box and is bent and branched from the concave-shaped cut-away portion of the side wall to the inside of the optical box so as to cross over the concave-shaped cut-away portion, the cover including a dustproof member provided on the cover to dustproof the inside of the optical box, the dustproof member being sandwiched between the cover and the side wall and between the cover and the connecting wall which a cable configured to connect a member arranged inside the optical box and a member arranged outside the optical box passes when the cover is mounted on the optical box, wherein a height of a distal end of the connecting wall, which the cable passes, from the bottom portion is larger than a height of a base portion of the concave-shaped cut-away portion from the bottom portion.

Further features of the present invention will become apparent from the following description of exemplary embodiments with reference to the attached drawings.

BRIEF DESCRIPTION OF THE DRAWINGS

FIG. 6 is a view for illustrating a positional relationship between the pressing portion and the connecting wall of the light scanning apparatus according to the embodiment.

FIGS. 7A, 7B, and 7C are views for illustrating a snap-fit configuration of the light scanning apparatus according to the embodiment.

DESCRIPTION OF THE EMBODIMENTS

Now, exemplary embodiments of the present invention will be described in detail with reference to the drawings.

Embodiment

Overview of Image Forming Apparatus

Figure 1A:
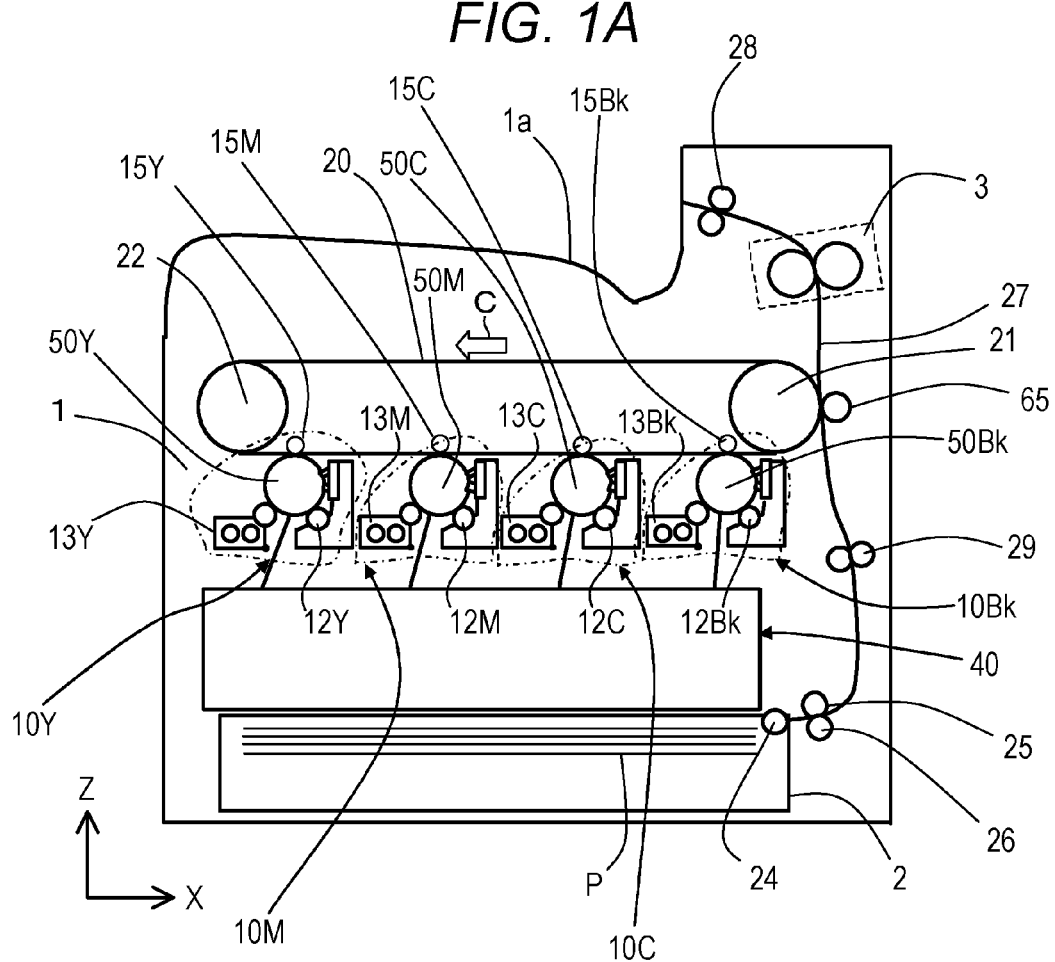
FIG. 1A is a schematic sectional view of an overall configuration of an image forming apparatus according to an embodiment.

Now, a configuration of an image forming apparatus 1 according to an embodiment will be described. The image forming apparatus 1 of the embodiment is a tandem-type color laser beam printer. However, the image forming apparatus 1 is not limited to the color laser beam printer and may also be a color copying machine or a monochrome printer. FIG. 1A is a schematic configuration view of an overall configuration of the image forming apparatus 1. The laser beam printer (hereinafter referred to simply as "printer") 1 includes four image forming portions 10Y, 10M, 10C, and 10Bk (indicated by the alternate long and short dash lines in FIG. 1A) configured to form toner images for respective colors of yellow (Y), magenta (M), cyan (C), and black (Bk). The printer 1 also includes an intermediate transfer belt 20 onto which the toner images are transferred respectively from the image forming portions 10Y, 10M, 10C, and 10Bk. The toner images, which are transferred onto the intermediate transfer belt 20 in a superimposed manner, are transferred onto a recording sheet P serving as a recording medium, to form a color image. The alphabets Y, M, C, and Bk representing the respective colors are hereinafter omitted unless needed. In the following description, a direction in which a rotation shaft of a rotary polygon mirror 45 described later extends is referred to as a Z-axis direction, a main-scanning direction which is a scanning direction of a light beam or a longitudinal direction of a reflecting mirror described later is referred to as a Y-axis direction, and a direction perpendicular to the Y-axis and the Z-axis is referred to as an X-axis direction. The X-axis direction is a traveling direction of the laser beam (optical axis direction) when the laser beam enters a lens of a scanning imaging optical system included in a light scanning apparatus 40 described later.

The intermediate transfer belt 20 is formed into an endless shape and is stretched over a pair of belt conveyance rollers 21 and 22 so that the toner image formed by the image forming portion 10 of each color is transferred onto the intermediate transfer belt 20 while the intermediate transfer belt 20 is rotating in a direction indicated by the arrow C. Further, a secondary transfer roller 65 is arranged at a position opposed to one belt conveyance roller 21 across the intermediate transfer belt 20. The recording sheet P is inserted between the secondary transfer roller 65 and the intermediate transfer belt 20 which are held in pressure contact with each other, with the result that the toner image is transferred onto the recording sheet P from the intermediate transfer belt 20. The four image forming portions 10Y, 10M, 10C, and 10Bk described above are arranged in parallel on a lower side of the intermediate transfer belt 20 so that the toner image formed in accordance with image information of each color is transferred onto the intermediate transfer belt 20 (hereinafter referred to as "primary transfer"). The four image forming portions 10 are arranged in the order of the image forming portion 10Y for yellow, the image forming portion 10M for magenta, the image forming portion 10C for cyan, and the image forming portion 10Bk for black in a rotation direction of the intermediate transfer belt 20 (direction indicated by the arrow C).

Further, the light scanning apparatus 40 configured to expose with light a photosensitive drum 50 serving as a photosensitive member provided in each image forming portion 10 in accordance with image information is arranged below the image forming portion 10. Note that, the detailed illustration and description of the light scanning apparatus 40 are omitted in FIG. 1A and described later with reference to FIG. 1B and FIG. 2. The light scanning apparatus 40 is shared by all the image forming portions 10Y, 10M, 10C, and 10Bk and includes four semiconductor lasers (not shown) configured to emit a laser beam modulated in accordance with image information of each color. Further, the light scanning apparatus 40 includes the rotary polygon mirror 45 and a scanner motor 42. The rotary polygon mirror 45 is a deflecting member configured to deflect the light beams so that the light beams corresponding to the respective photosensitive drums 50 scan the photosensitive drums 50 in an axial direction thereof (Y-axis direction). The scanner motor 42 is a driving unit configured to rotate the rotary polygon mirror 45. The light beams deflected by the rotary polygon mirror 45 are guided by an optical member installed in the light scanning apparatus 40 to be guided onto the photosensitive drums 50 (onto the photosensitive members), to thereby expose the photosensitive drums 50 with light.

Each image forming portion 10 includes the photosensitive drum 50 and a charging roller 12 configured to charge the photosensitive drum 50 to a uniform potential. Further, each image forming portion 10 includes a developing device 13 serving as a developing unit configured to form a toner image by developing an electrostatic latent image formed on the photosensitive drum 50 by being exposed with the light beam radiated thereonto. The developing device 13 is configured to form a toner image in accordance with image information of each color on the photosensitive drum 50. A primary transfer roller 15 is arranged at a position opposed to the photosensitive drum 50 of each image forming portion 10 across the intermediate transfer belt 20. When a predetermined transfer voltage is applied to the primary transfer roller 15, the toner image on the photosensitive drum 50 is transferred onto the intermediate transfer belt 20.

On the other hand, the recording sheet P is supplied from a feed cassette 2 received in a lower portion of a main body the printer 1 to an inner portion of the printer 1, specifically a secondary transfer position at which the intermediate transfer belt 20 and the secondary transfer roller 65 serving as a transfer unit come into abutment on each other. In an upper portion of the feed cassette 2, a pickup roller 24 configured to pull out the recording sheet P received in the feed cassette 2 and a feed roller 25 are arranged in parallel. Further, a retard roller 26 for preventing overlap feeding of the recording sheet P is arranged at a position opposed to the feed roller 25. A conveyance path 27 of the recording sheet P inside the printer 1 is provided substantially vertically along a right side surface of the main body of the printer 1 in FIG. 1A. The recording sheet P pulled out from the feed cassette 2 positioned in a bottom portion of the printer 1 ascends through the conveyance path 27 and is sent to registration rollers 29 configured to control an entry timing of the recording sheet P with respect to the secondary transfer position. After that, the toner image is transferred onto the recording sheet P at the secondary transfer position, and then the recording sheet P is sent to a fixing device 3 (indicated by the broken line in FIG. 1A) arranged on a downstream side in a conveyance direction. Then, the recording sheet P having the toner image fixed thereon by the fixing device 3 is delivered to a delivery tray 1a arranged in an upper portion of the main body of the printer 1 through delivery rollers 28.

When a color image is formed by the printer 1 configured as described above, first, the light scanning apparatus 40 exposes with light the photosensitive drum 50 of each image forming portion 10 at a predetermined timing in accordance with image information of each color. Consequently, a latent image in accordance with the image information is formed on the photosensitive drum 50 of each image forming portion 10. In order to obtain high image quality, the latent image formed by the light scanning apparatus 40 is required to be reproduced with high accuracy at a predetermined position on each of the photosensitive drums 50, while the amount of light beam for forming the latent image is required to constantly have a desired value in a stable manner. Therefore, it is important for the light scanning apparatus 40 to have a dustproof configuration so that the optical elements arranged therein are not contaminated by dust or dirt outside of the apparatus. At the same time, dustproof effects are desired to be exhibited by simple work.

[Configuration of Light Scanning Apparatus]

Figure 1B:
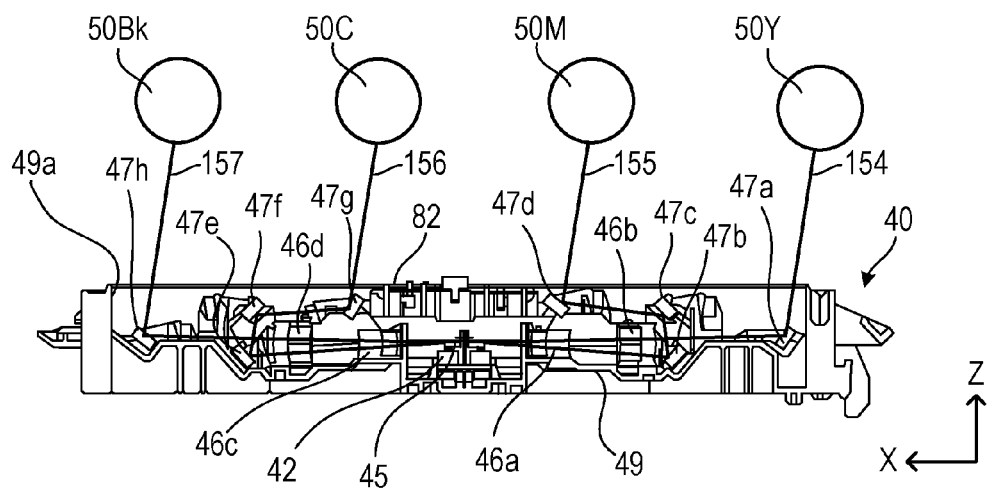
FIG. 1B is a sectional view of a light scanning apparatus.

FIG. 1B is a schematic view for illustrating an overview of the light scanning apparatus 40 when the optical components are mounted. A light source unit 201 (see FIG. 3A described later) having mounted therein a light source configured to emit a light beam (laser light) is installed on an outer peripheral portion of the light scanning apparatus 40, and the rotary polygon mirror 45 configured to deflect the light beam and the scanner motor 42 are installed inside the light scanning apparatus 40. Further, the light scanning apparatus 40 includes fθ lenses 46a to 46d and reflecting mirrors 47a to 47h configured to guide each light beam onto the photosensitive drum 50 to image the light beam.

A light beam 154 (also referred to as Y-scanning line 154) corresponding to the photosensitive drum 50Y emitted from the light source unit 201 (see FIG. 3A) is deflected by the rotary polygon mirror 45 and enters the fθ lens 46a. The light beam 154 having passed through the fθ lens 46a enters the fθ lens 46b, and passes through the fθ lens 46b to be reflected by the reflecting mirror 47a. The light beam 154 reflected by the reflecting mirror 47a passes through an opening portion 88 which is a transparent window (see FIG. 2) to scan the photosensitive drum 50Y.

A light beam 155 (also referred to as M-scanning line 155) corresponding to the photosensitive drum 50M emitted from the light source unit 201 (see FIG. 3A) is deflected by the rotary polygon mirror 45 and enters the fθ lens 46a. The light beam 155 having passed through the fθ lens 46a enters the fθ lens 46b, and passes through the fθ lens 46b to be reflected by the reflecting mirrors 47b, 47c, and 47d. The light beam 155 reflected by the reflecting mirror 47d passes through an opening portion 88 which is a transparent window (see FIG. 2) to scan the photosensitive drum 50M.

A light beam 156 (also referred to as C-scanning line 156) corresponding to the photosensitive drum 50C emitted from the light source unit 201 (see FIG. 3A) is deflected by the rotary polygon mirror 45 and enters the fθ lens 46c. The light beam 156 having passed through the fθ lens 46c enters the fθ lens 46d, and passes through the fθ lens 46d to be reflected by the reflecting mirrors 47e, 47f, and 47g. The light beam 156 reflected by the reflecting mirror 47g passes through an opening portion 88 which is a transparent window (see FIG. 2) to scan the photosensitive drum 50C.

A light beam 157 (also referred to as K-scanning line 157) corresponding to the photosensitive drum 50Bk emitted from the light source unit 201 (see FIG. 3A) is deflected by the rotary polygon mirror 45 and enters the fθ lens 46c. The light beam 157 having passed through the fθ lens 46c enters the fθ lens 46d, and passes through the fθ lens 46d to be reflected by the reflecting mirror 47h. The light beam 157 reflected by the reflecting mirror 47h passes through an opening portion 88 which is a transparent window (see FIG. 2) to scan the photosensitive drum 50Bk. An optical box 49 (also referred to as "casing 49") which is a casing of the light scanning apparatus 40 is open upward in FIG. 1B. As illustrated in FIG. 1B, an upper cover 82 is mounted onto the optical box 49 so as to cover an opening portion 49a of the optical box 49.

[Configuration of Upper Cover]

Figure 2:
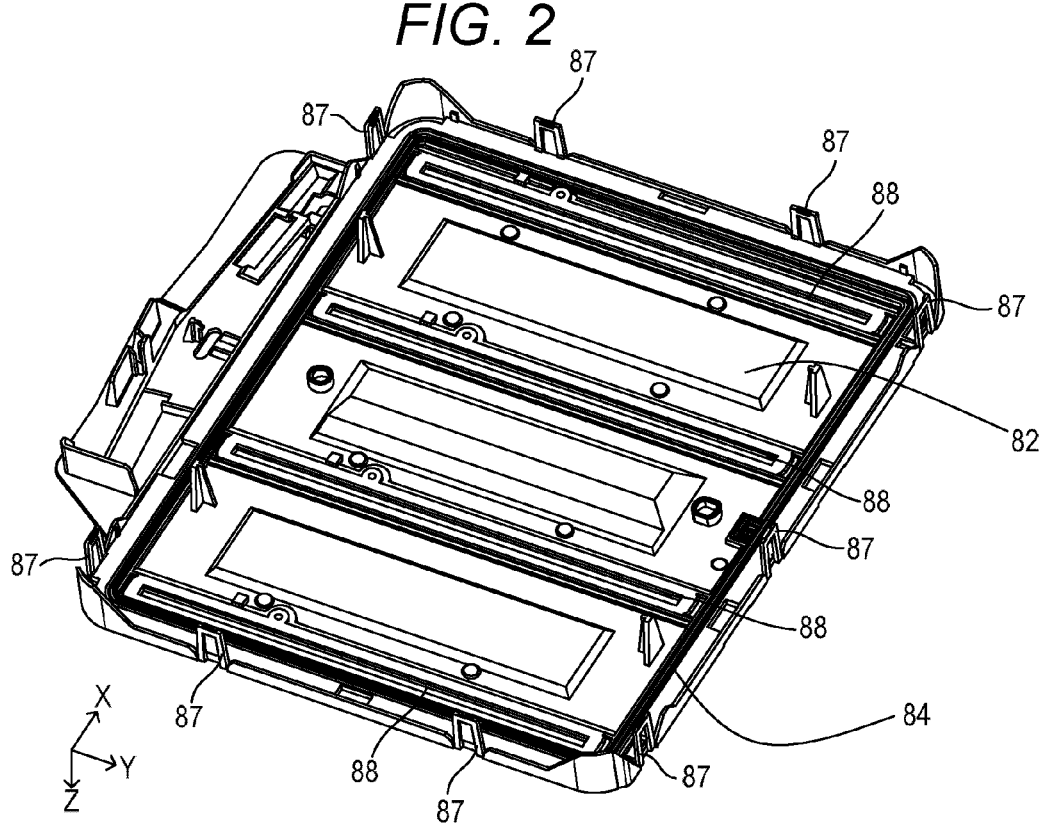
FIG. 2 is a perspective view of a configuration of an upper cover of the light scanning apparatus according to the embodiment.

FIG. 2 is a perspective view for illustrating a bottom surface of the upper cover 82, that is, a surface of the upper cover 82 on a side opposed to the optical box 49 when the upper cover 82 is mounted onto the optical box 49. On the bottom surface of the upper cover 82, a sealing portion (indicated by the thick black portion in FIG. 2) is provided on the entire periphery of a portion that comes into abutment on outer peripheral edges (top surfaces of outer peripheral walls) which are side walls of the optical box 49 when the upper cover 82 is mounted onto the optical box 49. The sealing portion 84 is molded on the upper cover 82 by injecting an elastic member into a space between the upper cover 82 and a mold which is held in abutment on the upper cover 82 so as to be integrated with the upper cover 82. By locking snap-fits 87 formed on the upper cover 82 to protruding portions 89 (FIG. 3A) formed on outer wall side surfaces of the side walls of the optical box 49 described above, the upper cover 82 is mounted onto the optical box 49. Then, the sealing portion 84 which also serves as a dustproof member is sandwiched between the optical box 49 and the upper cover 82 to interrupt the communication between inside and outside of the optical box 49 through the sealing portion 84 so that the space is sealed. In this manner, the inside of the optical box 49 is dustproofed. Further, in order to scan the laser light from the inside of the light scanning apparatus 40 to the outside thereof (photosensitive drums 50), the plurality of opening portions 88 are formed in the upper cover 82.

[Cut-Away Portion and Connecting Wall]

Figure 3A:
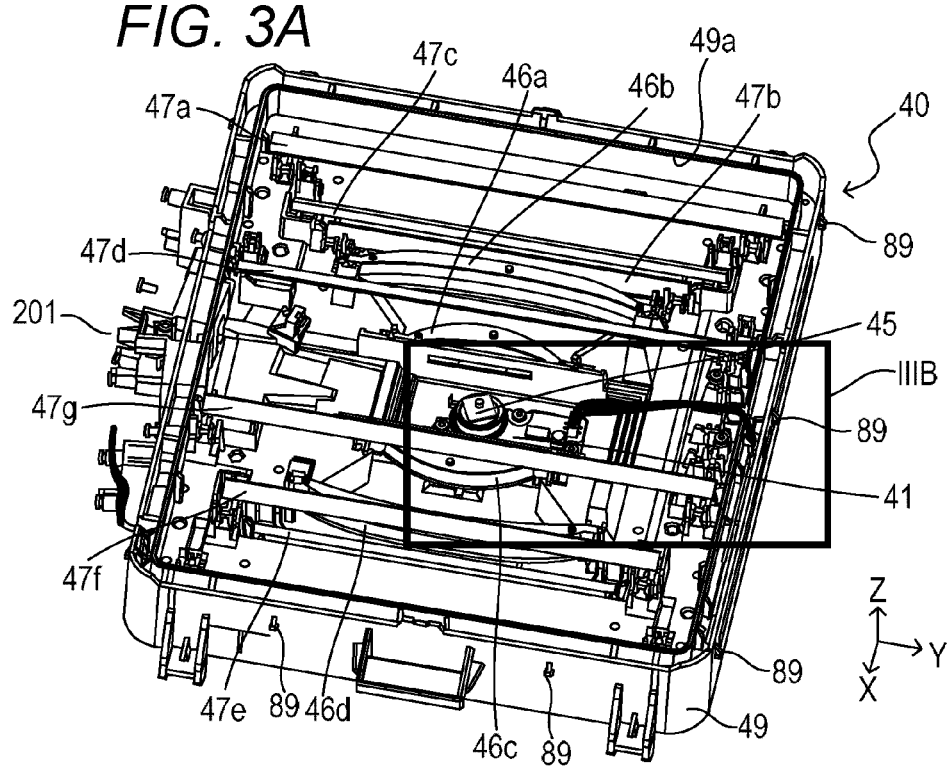
FIGS. 3A, 3B, and 3C are views for illustrating a cut-away portion and a connecting wall of the light scanning apparatus according to the embodiment.

FIG. 3A is a perspective view of an overview of the light scanning apparatus 40 arranged in the printer 1 illustrated in FIG. 1A. The light scanning apparatus 40 illustrated in FIG. 3A is in a state in which the upper cover 82 is removed from the optical box 49 illustrated in FIG. 1B. The light source unit 201 having mounted therein the light source configured to emit the laser light is arranged on an outer peripheral portion of the optical box 49 of the light scanning apparatus 40. Further, the rotary polygon mirror 45, a deflector 41, the plurality of fθ lenses 46, and the plurality of reflecting mirrors 47 are installed in the optical box 49. The rotary polygon mirror 45 is configured to reflect and deflect the laser light emitted from the light source unit 201. The deflector 41 is configured to support and rotate the rotary polygon mirror 45 at a high speed. The fθ lenses 46 are configured to transmit the laser light, whereas the reflecting mirrors 47 are configured to reflect the laser light. Further, the protruding portions 89 that are engaged portions are formed on the outer wall side surfaces of the side walls of the optical box 49 at positions corresponding to the snap-fits 87 which are engaging portions formed on the upper cover 82. By locking the snap-fits 87 to the protruding portions 89, the upper cover 82 is supported and fixed onto the optical box 49.

Figure 3B:
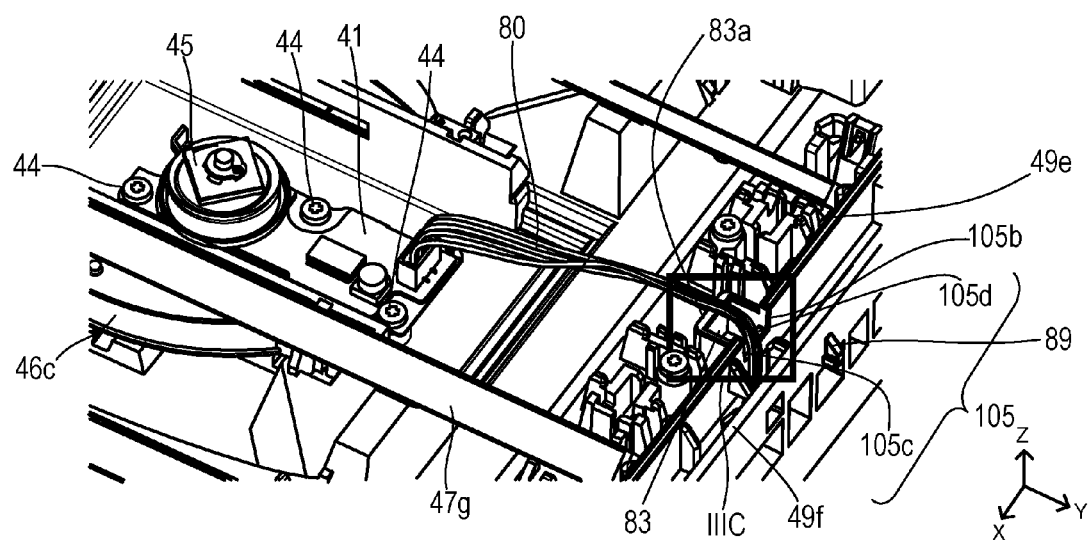
Figure 3C:
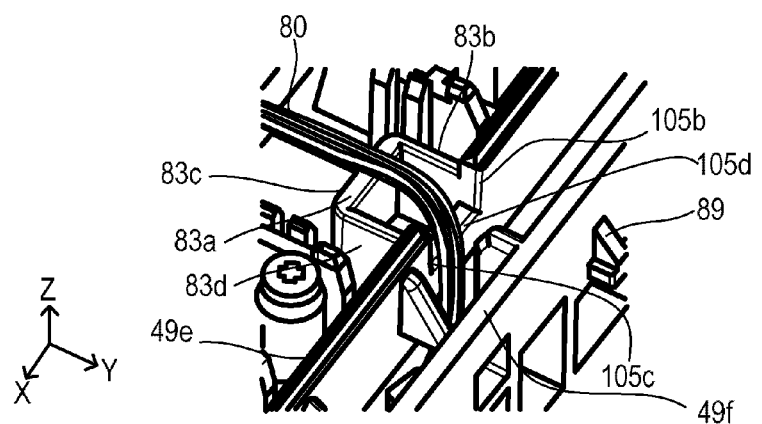

FIG. 3B is an enlarged perspective view of a portion in the thick black frame IIIB of FIG. 3A. FIG. 3C is an enlarged perspective view of a portion in the black frame IIIC of FIG. 3B. The deflector 41 which supports the rotary polygon mirror 45 is fixed to the optical box 49 with three screws 44. One end of an electric cable 80 guided from outside of the light scanning apparatus 40 is connected to the deflector 41 which is an internal member. The deflector 41 is supplied with electric power necessary for an operation through the electric cable 80, and is configured to transmit and receive operation instruction signals for the rotary polygon mirror 45 to and from a control board which is an external member arranged outside of the light scanning apparatus 40, to which another end of the electric cable 80 is connected.

A cut-away portion 105 configured to allow the electric cable 80 to pass therethrough is formed in a wall surface 49e (also referred to as "outer peripheral wall 49e") of an outer peripheral portion of the optical box 49, which is located in the vicinity of the deflector 41. The cut-away portion 105 is formed by cutting the wall surface 49e of the outer peripheral portion located inside of the optical box 49 away in a concave shape to extend from a top portion of the wall surface 49e toward a bottom portion of the optical box 49. The cut-away portion 105 is formed by a first standing wall portion 105b, a second standing wall portion 105c, and a base portion 105d. The first standing wall portion 105b is a standing wall formed by cutting away the outer peripheral wall (inner wall) 49e of the optical box 49. An end of the first standing wall portion 105b which is located on the side of the bottom portion of the optical box 49 is connected to (in connection with) an end of the base portion 105d. Similarly, the second standing wall portion 105c is a standing wall formed by cutting away the outer peripheral wall (inner wall) 49e of the optical box 49. An end of the second standing wall portion 105c which is located on the side of the bottom portion of the optical box 49 is connected to (in connection with) an end of the base portion 105d on the side opposite to the end connected to the first standing portion 105b. As illustrated in FIG. 3B and FIG. 3C, the optical box 49 includes two outer peripheral portions, that is, the outer peripheral portion (inner wall) 49e which is a first side wall including the cut-away portion 105 and an outer peripheral portion (outer wall) 49f which is a second side wall including the protruding portions 89. The term "outer peripheral portion" or "outer peripheral wall" hereinafter means the outer peripheral portion or the outer peripheral wall 49e including the cut-way portion 105 unless otherwise noted.

A connecting wall 83 includes three walls 83b, 83c, and 83d which stand from the bottom portion of the optical box 49 to be bent and branched from the outer peripheral wall 49e of the optical box 49. The walls 83b, 83c, and 83d of the connecting wall 83 form a concave shape which surrounds (crosses over) the cut-away portion 105 in an inside direction (negative Y-axis direction) with respect to the optical box 49. One end of the wall 83b and one end of the wall 83d are respectively connected (linked) to portions of the cut-away portion 105 in the vicinity of the first standing wall portion 105b and in the vicinity of the second wall portion 105c. Another end of the wall 83b and another end of the wall 83d are connected (linked) to ends of the wall 83c. A height position of an entire distal end 83a of the connecting wall 83 illustrated in FIG. 3B and FIG. 3C, which is a top portion opposed to the upper cover 82, in a direction toward the upper cover 82 is lower than a height position of a top portion of the outer peripheral wall 49e of the optical box 49, which is connected to the connecting wall 83, in the direction toward the upper cover 82. A height position of a part of the distal end 83a of the connecting wall 83 in the direction toward the upper cover 82 may be set lower than the height position of the top portion of the outer peripheral wall 49e of the optical box 49, which is connected to the connecting wall 83, in the direction toward the upper cover 82. Alternatively, the distal end 83a of the connecting wall 83 may be formed so that the height position of the entire distal end 83a in the direction toward the upper cover 82 is the same as that of the top portion of the outer peripheral wall 49e of the optical box 49, which is connected to the connecting wall 83, in the direction toward the upper cover 82.

The electric cable 80 is arranged so as to pass over the connecting wall 83 and through the cut-away portion 105 formed in the outer peripheral wall 49e of the optical box 49 to be connected to the control board (not shown) arranged outside of the light scanning apparatus 40. When the upper cover 82 is mounted onto the optical box 49 so as to cover the opening portion 49a of the optical box 49, the electric cable 80 is sandwiched between the distal end 83a of the connecting wall 83 which is the top portion opposed to the upper cover 82 and the sealing portion 84 provided to the upper cover 82 in advance. By pressing the electric cable 80 with the sealing portion 84 which is the elastic member provided on the upper cover 82 in advance in this manner, a clearance formed by the intersecting electric cables 80 which are bundled wires is eliminated (closed). In this manner, a worker can work verifying only a position to press the electric cable 80 without focusing on a state of the elastic member which forms the sealing portion 84, which is needed in the above-mentioned case where the foamed member is used. Therefore, as compared with related-art configurations, workability can be improved.

[Positional Relationship Between Cut-Away Portion, Connecting Wall, and Electric Cable]

Figure 4:
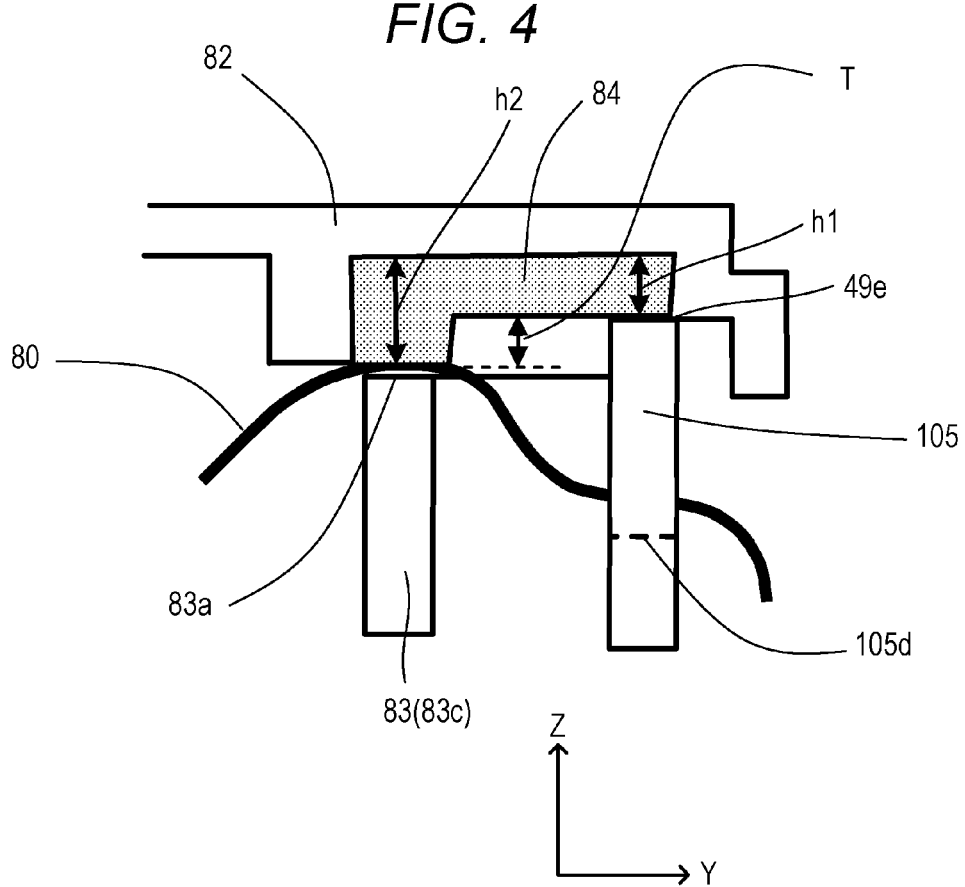
FIG. 4 is a view for illustrating a positional relationship between the cut-away portion, the connecting wall, and an electric cable of the light scanning apparatus according to the embodiment of the embodiment.

FIG. 4 is a schematic view of a cross section in an enlarged manner when the wall 83c of the connecting wall 83 is cut along the Y-Z plane, for illustrating a positional relationship between the cut-away portion 105, the connecting wall 83, and the electric cable 80 when the upper cover 82 is mounted onto the optical box 49. The sealing portion 84 includes a portion in abutment on the top portion of the outer peripheral wall 49e of the optical box 49 and a portion in abutment on the above-mentioned distal end 83a of the connecting wall 83. For a height of the sealing portion 84 in a direction toward the optical box 49 (negative Z-axis direction), a height (h2 in FIG. 4) of the side (pressing portion 84a described later) in abutment on the connecting wall 83 is larger than a height (h1 in FIG. 4) of the side in abutment on the top portion of the outer peripheral wall 49e (h2>h1). When the upper cover 82 is mounted onto the optical box 49, the electric cable 80 is pressed toward the connecting wall 83 by the elastic member which forms the sealing portion 84. Further, the electric cable 80 passes through the cut-way portion 105 to be connected to the external control board.

In the embodiment, the height of the first standing wall portion 105b and the second standing wall portion 105c, that is, a distance from the top portion of the outer peripheral wall 49e to the base portion 105d of the cut-away portion 105 is increased to increase a depth of the cut-away portion 105. In this manner, ease of installation for guiding the electric cable 80 inside the optical box 49 is improved. Further, the distal end 83a of the connecting wall 83 is located at a position closer to the upper cover 82 than the base portion 105d of the cut-away portion 105. Therefore, a projecting amount T of a portion of the sealing portion 84, which is brought into abutment on the distal end 83a of the connecting wall 83, can be made smaller than a projecting amount in a case where the sealing portion 84 is brought into abutment on the base portion 105d of the cut-away portion 105. The sealing portion 84 is formed of the elastic member made of a soft material. Therefore, if the projecting amount T is large, the dustproof performance is lowered in some cases due to deformation of the elastic member in an unintended direction when the upper cover 82 is mounted onto the optical box 49. In the embodiment, the projecting amount T is small. Therefore, the amount of deformation of the elastic member, which is generated when the upper cover 82 is mounted onto the optical box 49, can be reduced. Thus, the occurrence of the problem of the lowered dustproof performance provided by the sealing portion 84 can be prevented.

[Pressing Portion for Electric Cable]

Figure 5A:
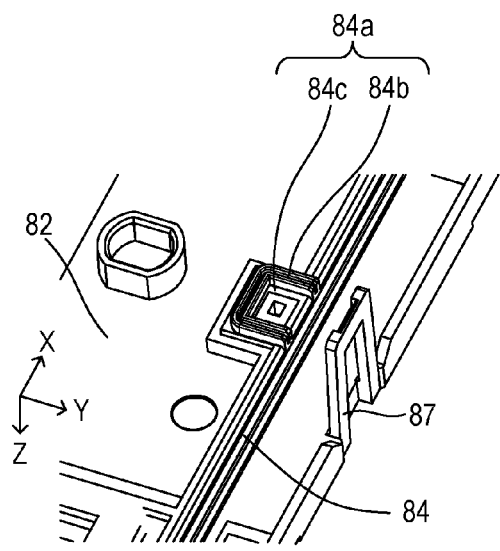
FIGS. 5A, 5B, 5C, and 5D are views for illustrating a pressing portion of the light scanning apparatus for the electric cable according to the embodiment.
Figure 5B:
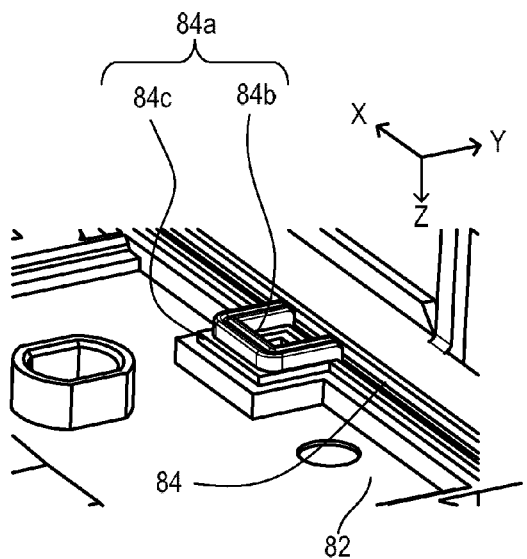
Figure 5C:
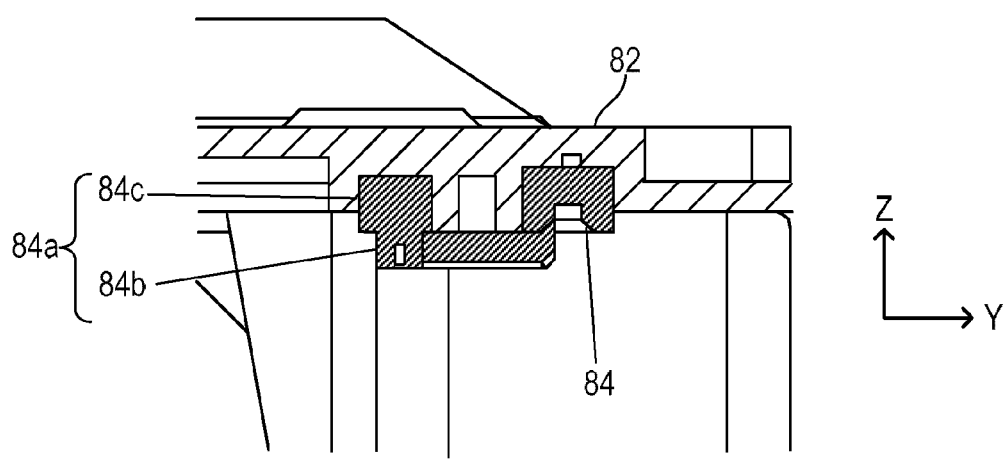

FIG. 5A and FIG. 5B are perspective views for illustrating the pressing portion 84a which is a portion of the sealing portion 84 of the upper cover 82, which is to be brought into abutment on the distal end 83a of the connecting wall 83, in an enlarged manner. FIG. 5A and FIG. 5B are perspective views of a bottom surface of the upper cover 82, that is, a surface of the upper cover 82 on a side opposed to the optical box 49 when the upper cover 82 is mounted onto the optical box 49. FIG. 5C is a schematic view of a cross section of the upper cover 82 including the pressing portion 84a in an enlarged manner when a part of the pressing portion 84a which is held in abutment on the wall 83c constructing the connecting wall 83 is cut along the Y-Z plane. The pressing portion 84a is formed continuously from the sealing portion 84 for filling the clearance between the outer peripheral wall 49e of the optical box 49 and the upper cover 82, and extends along a shape (path) of the distal end 83a of the connecting wall 83 which is formed on the inner side of the optical box 49. By the configuration described above, the electric cable 80 passing over the distal end 83a of the connecting wall 83 is pressed. As a result, sealing performance between the optical box 49 and the upper cover 82 can be further increased when the upper cover 82 is mounted onto the optical box 49, thereby enabling the improvement of the dustproof performance. A height of the connecting wall 83 from the bottom portion of the optical box 49 is smaller than a height of the distal end of the outer peripheral wall 49e from the bottom portion of the optical box 49. Therefore, a height of the pressing portion 84a from the upper cover 82 is larger than a height of the sealing portion 84 from the upper cover 82.

As illustrated in FIG. 5A and FIG. 5B, the pressing portion 84a includes a foundation portion 84c and a cable contact portion 84b. The foundation portion 84c is formed so as to have a larger width on a side closer to the upper cover 82. The cable contact portion 84b is formed on the top of the foundation portion 84c so as to have a smaller width. The cable contact portion 84b includes a plurality of protruding portions, each having a protruding shape projecting from the foundation portion 84c. Each of the protruding portions is formed along the shape (path) of the distal end 83a of the connecting wall 83 on which the protruding portions are brought into abutment. Further, an interval R1 (see FIG. 6)

described later is provided between the protruding portions of the cable contact portion 84*b*. Although the cable contact portion 84*b* includes two protruding portions in FIGS. 5A to 5C, the number of protruding portions is not limited to two. Three of more protruding portions may be formed. In this case, the cable contact portion 84*b* has been described as including the two protruding portions which are separated away from each other by the interval R1. The cable contact portion 84*b* may also be described as a single protruding portion including a groove portion having the width R1 formed in the center. By reliably pressing the electric cable 80 against the distal end 83*a* of the connecting wall 83 by the cable contact portion 84*b*, the bundled electric cables 80 that intersect with each other in a vertical direction (Z-axis direction) are pressed to be widened in a horizontal direction (X-axis direction). As a result, each of the bundled electric cable 80 is individually brought into abutment on the distal end 83*a*. The cable contact portion 84*b* has a thickness (in the Z-axis direction) of about 1 mm and is easily deformable. Therefore, by pressing the cable contact portion 84*b* against the electric cable 80, the cable contact portion 84*b* is deformed in conformity with the shape of the electric cable 80 at a portion where the cable contact portion 84*b* and the electric cable 80 are held in contact with each other. As a result, the cable contact portion 84*b* can be held in close contact with the electric cable 80 to close the clearance between the cable contact portion 84*b* and the electric cable 80. Thus, the dustproof performance can be improved.

Figure 5D:
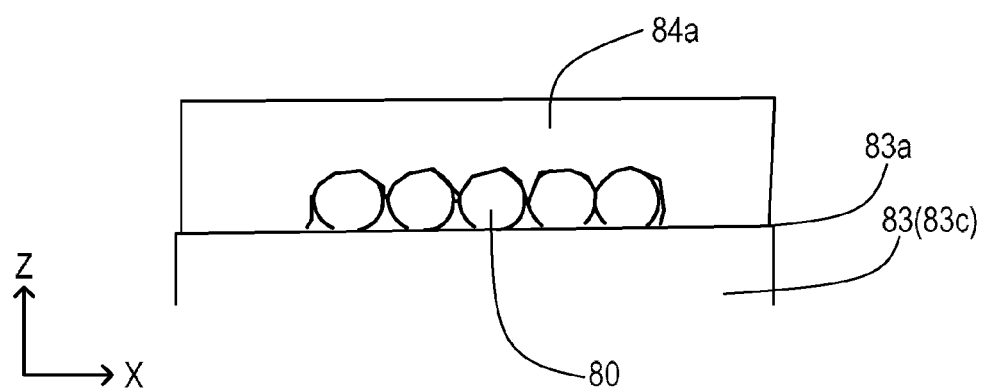

FIG. 5D is a schematic view of a state in which the electric cable 80 is pressed by the cable contact portion 84*b* of the pressing portion 84*a* in a direction toward the distal end 83*a* of the connecting wall 83 when the upper cover 82 is mounted onto the optical box 49, as viewed in the Y-axis direction. In many cases, the electric cables 80 are bundled in a state of being installed (laid) in the optical box 49. Therefore, the electric cables 80 are frequently arranged so as to intersect with each other in the vertical direction at a plurality of positions. In the configuration of the embodiment, the electric cable 80 is pressed by the pressing portion 84*a* against the distal end 83*a* of the connecting wall 83 having a smaller thickness. As a result, the electric cables 80 in a state of intersecting with each other in the vertical direction move to be arranged horizontally (are arranged side by side in a row). As a result, the electric cables 80 are pressed to be spread on the distal end 83*a* of the connecting wall 83. In the embodiment, examination and verification are carried out with a thickness of the connecting wall 83 (width in the Y-axis direction) being set to 3 mm.

[Positional Relationship Between Pressing Portion and Connecting Wall]

FIG. 6 is a schematic view for illustrating a relationship between the pressing portion 84*a* and the connecting wall 83 in position and size. In FIG. 6, the illustration of the upper cover 82, the outer peripheral wall 49*e* of the optical box 49, and the like is omitted. As described above, the cable contact portion 84*b* includes the two protruding portions which are formed along the distal end 83*a* of the connecting wall 83. In FIG. 6, there are defined the interval R1 (distance in the Y-axis direction) between the two protruding portions of the cable contact portion 84*b*, and a width R2 (length in the Y-axis direction, which is also a thickness of the connecting wall 83) of the distal end 83*a* (in particular, the distal end 83*a* of the wall 83*c*) on which the cable contact portion 84*b* is held in abutment. In the embodiment, the interval R1 is set smaller than the width R2 (3 mm corresponding to the thickness of the connecting wall 83 described above) (R1<R2). The interval R1, which has been described as the interval between the two protruding portions of the cable contact portion 84*b*, may also be described as the width of the groove portion formed in the center of the cable contact portion 84*b* which is the single protruding portion.

As a method of fixing the cover member (upper cover 82 of the embodiment) to the casing (optical box 49 of the embodiment) in recent years, a method of engaging the snap-fits formed on the cover member with the protruding portions of the casing has become the mainstream in view of workability. Therefore, a countermeasure against misalignment of the cover member from the casing at the time of mounting the cover member onto the casing greatly affects the dustproof performance. In the embodiment, in a case where the position at which the upper cover 82 is mounted is moved with respect to (misaligned from) the optical box 49 within a mounting tolerance, the cable contact portion 84*b* is positioned at a position opposed to the distal end 83*a* of the connecting wall 83 without fail. Therefore, a portion of the distal end 83*a* of the connecting wall 83, on which the electric cable 80 is laid, can be sealed with the cable contact portion 84*b*.

[Positional Relationship Between Pressing Portion and Snap-Fits]

Figure 7B:
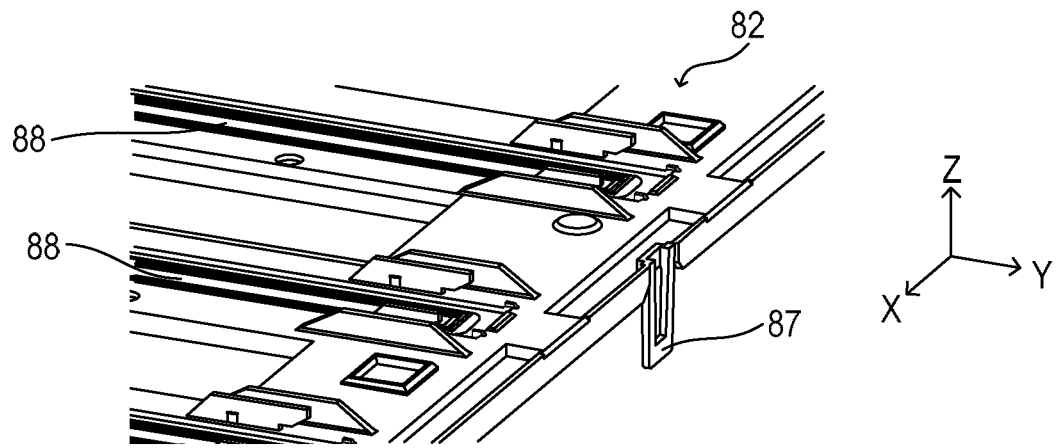

FIG. 7A is a top view of a surface of the upper cover 82, that is, a top view of the upper cover 82 as viewed from a side opposite to the side of the upper cover 82, which is opposed to the optical box 49 when the upper cover 82 is mounted onto the optical box 49. FIG. 7B is an enlarged perspective view of a periphery of the snap-fit 87 in a block surrounded by the broken-line frame VIIB in FIG. 7A. In an outer peripheral portion of the upper cover 82, the plurality of snap-fits 87 are formed. The snap-fits 87 are configured to be hooked to the protruding portions 89 of the optical box 49 to fix the upper cover 82 to the optical box 49. Further, the plurality of opening portions 88 through which the laser light passes are formed in the upper cover 82 so as to scan the photosensitive drums 50 with the laser light emitted from the light scanning apparatus 40. Further, inside the broken-line frame VIIB, two smaller broken-line frames are present. The two broken-line frames respectively indicate a position of the deflector 41 and a position of the cable contact portion 84*b* which comes into abutment on the distal end 83*a* of the connecting wall 83 when the upper cover 82 is mounted onto the optical box 49. In the embodiment, when there exist a plurality of regions (blocks) (interval of one of the regions in the X-axis direction is indicated by the reference symbol S in FIG. 7A) each sandwiched at both sides between the opening portions 88 in a transversal direction perpendicular to the longitudinal direction of the opening portions 88 (X-axis direction), the snap-fit 87 which is the closest to the pressing portion 84*a* is located in the same region (within the interval S) as the portion in which the pressing portion 84*a* is located. In this manner, in one block (broken-line frame VIIB in FIG. 7A) sandwiched between the adjacent two opening portions 88, that is, the opening portions 88 through which the laser light for scanning the photosensitive drums 50M and 50C passes, the pressing portion 84*a* formed of the elastic member and the snap-fit 87 are both present. As a result, the upper cover 82 which is the cover member can be prevented from being deformed by a repulsion force generated when the pressing portion 84*a* presses the electric cable 80. Thus, stable dustproof performance can be ensured.

Figure 7C:
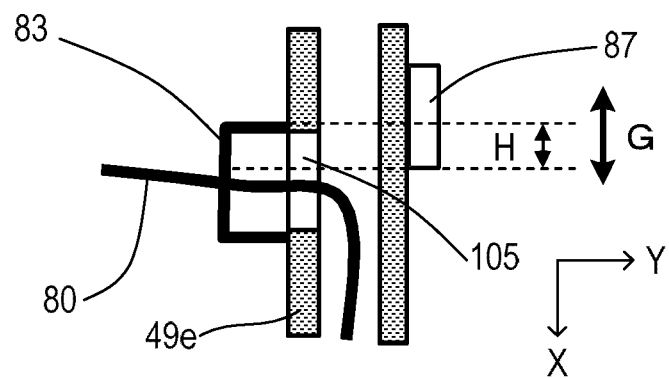

FIG. 7C is a schematic view for illustrating a positional relationship between the cut-away portion 105, the connecting wall 83 and the electric cable 80 to be pressed by the pressing portion 84*a*, and the snap-fit 87 that is the closest to the pressing portion 84*a* when the upper cover 82 is mounted onto the optical box 49. In FIG. 7C, the positional relationship as viewed from the surface side of the upper cover 82 is illustrated. As illustrated in FIG. 7C, the connecting wall 83 on which the pressing portion 84a formed of the elastic member is held in abutment and the snap-fit 87 have a positional relationship so as to partially overlap each other (portion indicated by the arrow H in FIG. 7C) in a direction along a wall surface of the outer peripheral wall 49e of the optical box 49 (indicated by the reference symbol G in FIG. 7C). With the positional relationship described above, the deformation of the upper cover 82 caused by the repulsion force of the pressing portion 84a can be suppressed. As a result, the dustproof performance can be stabilized.

[Regulating Portion for Electric Cable]

Figure 8A:
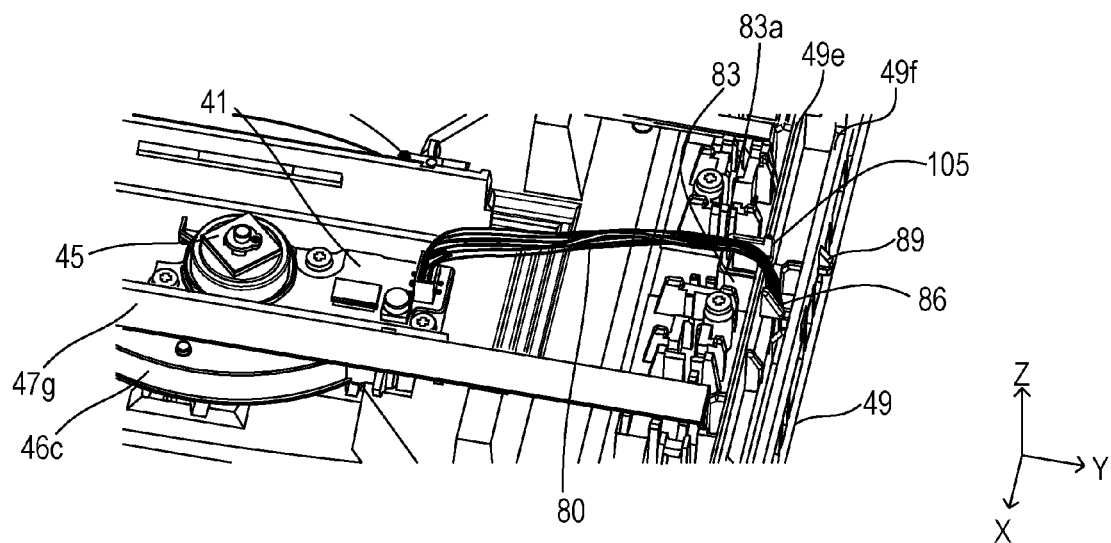
FIGS. 8A and 8B are views for illustrating a regulating portion of the light canning apparatus for the electric cable according to the embodiment.
Figure 8B:
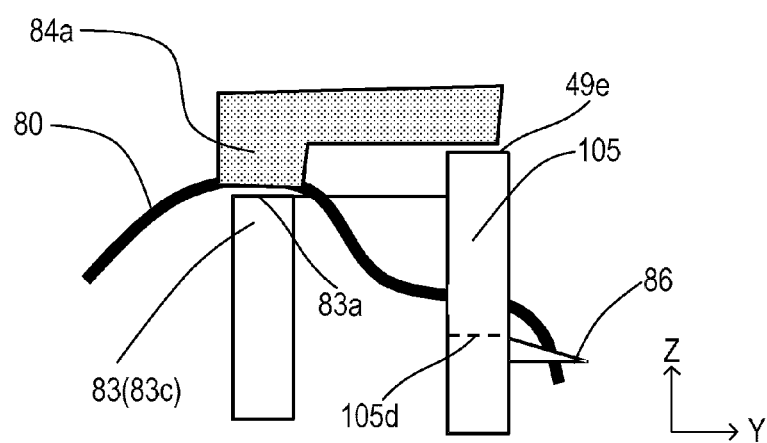

FIG. 8A is a perspective view for illustrating a state in which the electric cable 80 is arranged inside the optical box 49. FIG. 8B is a schematic view of a cross section of the vicinity of the connecting wall 83 in an enlarged manner, for illustrating a positional relationship between the cut-away portion 105, the connecting wall 83, the electric cable 80, and a regulating portion 86 when the upper cover 82 is mounted onto the optical box 49. As illustrated in FIG. 8A, one end of the electric cable 80 is connected to the deflector 41. The electric cable 80 passes over the distal end 83a of the connecting wall 83 and passes through the cut-away portion 105. Then, the electric cable 80 is guided between the two outer peripheral walls 49e and 49f of the optical box 49. At this time, the electric cable 80 is laid so as to pass below the regulating portion 86. The regulating portion 86 is provided so as to regulate a position at which the electric cable 80 is arranged. As illustrated in FIG. 8B, the regulating portion 86 is provided at a position lower than the distal end 83a of the connecting wall 83 (in the Z-axis direction) and also at a position lower than the base portion 105d of the cut-away portion 105 (in the Z-axis direction) on the side, which is opposite to the connecting wall 83, of the outer peripheral wall 49e of the optical box 49. In this manner, the electric cable 80 can be introduced into the cut-away portion 105 from the low position in the optical box 49 in the Z-axis direction. Therefore, the electric cable 80 can be more reliably guided under the pressing portion 84a. As a result, workability in mounting the upper cover 82 onto the optical box 49 can be improved.

Further, as illustrated in FIG. 8A, the electric cable 80 is laid between the two outer peripheral walls 49e and 49f, that is, the outer peripheral wall 49e having the cut-away portion 105 formed therein and the outer peripheral wall 49f on which the projecting portions 89 are formed. In this manner, by arranging the electric cable 80 between the two outer peripheral walls 49e and 49f, the arrangement of the electric cable 80 can be reliably regulated. As a result, the electric cable 80 can be easily guided under the pressing portion 84a. In the embodiment, the regulation on the electric cable 80 is strengthened by installing, for example, another member to the cut-away portion 105, thereby enabling the improvement of the workability at the time of mounting the upper cover 82 onto the optical box 49.

Further, in the embodiment, the electric cable 80 has been described as being arranged to supply electric power to the deflector and to transmit and receive the signals to and from the deflector 41. Even for a cable configured to supply electric power to another electric component and to transmit and receive signals to and from another electric component such as a synchronous signal acquisition sensor for laser-light scanning arranged inside the light scanning apparatus, the same effects as those of the embodiment can be obtained.

[Comparison of Dustproof Performance between Embodiment and Related Art]

Figure 9:
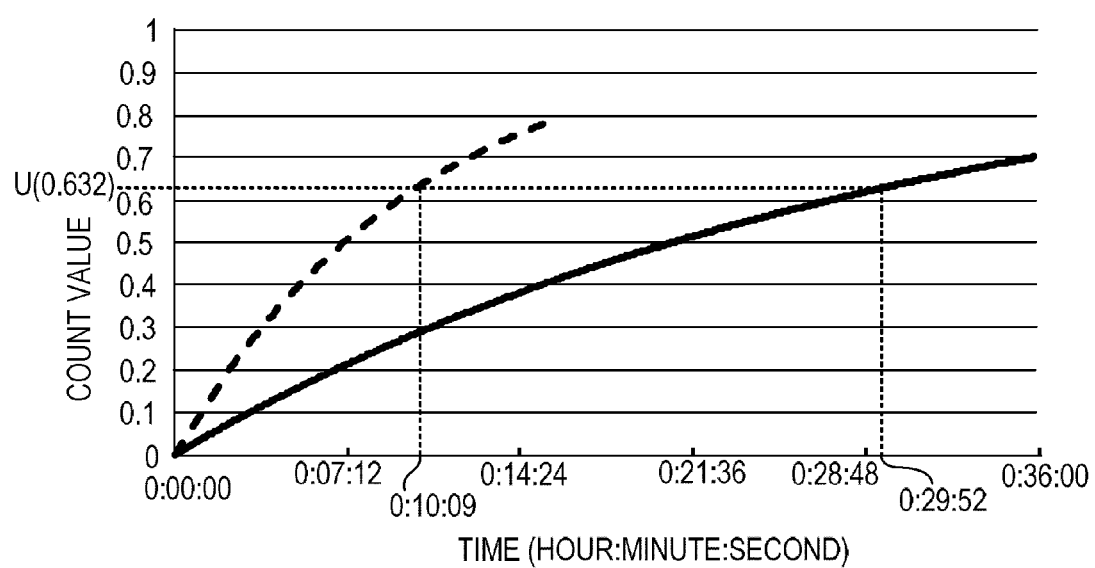
FIG. 9 is a graph for showing dustproof performance of the light scanning apparatus according to the embodiment.

FIG. 9 is a graph of comparison, through an experiment, between dustproof performance of the embodiment where the elastic member is used for the sealing portion 84 and dustproof performance of the related art where the above-mentioned clearance between the cover member and the casing is sealed with a foamed member. In FIG. 9, the broken line indicates the dustproof performance of the related art, whereas the solid line indicates the dustproof performance of the embodiment. The vertical axis of FIG. 9 indicates the amount of microparticles (indicated as "count value" in FIG. 9) equal to or smaller than 5 μm of, for example, a methane gas which enters the light scanning apparatus while the deflector 41 is driven, whereas the horizontal axis indicates elapsed time from the start of driving of the deflector 41 (in hour: minute: second as a unit). In FIG. 9, the amount of methane gas entering the light scanning apparatus when an amount of molecules of the methane gas per unit volume outside of the light scanning apparatus is regarded as 1 is shown.

The line U is a line indicating 63.2%, which is a time constant. A time at an intersection between the broken line and the line U is 10 minutes and 9 seconds, whereas a time at an intersection between the solid line and the line U is 29 minutes and 52 seconds. From FIG. 9, it is understood that, in the light scanning apparatus of the embodiment, the time to reach the line U indicated by the dotted line is increased to be about three times as long as that of the related art and therefore, the dustproof performance is improved. Therefore, the contamination inside the light scanning apparatus, which is the problem to be solved in recent years, can be reduced. As a result, the maintenance work such as the replacement of the light scanning apparatus and the cleaning of the reflecting surfaces of the rotary polygon mirror can be reduced.

As described above, according to the embodiment, the dustproof performance as well as the workability can be improved.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-007737, filed Jan. 19, 2015, which is hereby incorporated by reference herein in its entirety.

What is claimed is:

1. A light scanning apparatus, comprising:
   a light source configured to emit a light beam;
   a deflector configured to deflect the light beam emitted from the light source;
   an optical member configured to guide the deflected light beam to a photosensitive member;
   an optical box, which the light source is mounted to, configured to hold the deflector and the optical member in an inside of the optical box; and
   a cover configured to cover an opening of the optical box, the optical box including:
   a concave-shaped cut-away portion formed from a top portion of a side wall of the optical box toward a bottom portion of the optical box; and
   a connecting wall which stands from the bottom portion of the optical box and is bent and branched from the concave-shaped cut-away portion of the side wall to the inside of the optical box so as to cross over the concave-shaped cut-away portion, the cover including a dustproof member provided on the cover to dustproof the inside of the optical box, the dustproof member being sandwiched between the cover and the side wall and between the cover and the connecting wall which a cable configured to connect a member arranged inside the optical box and a member arranged outside the optical box passes when the cover is mounted on the optical box, wherein a height of a distal end of the connecting wall, which the cable passes, from the bottom portion is larger than a height of a base portion of the concave-shaped cut-away portion from the bottom portion.

2. A light scanning apparatus according to claim 1, wherein a portion of the dustproof member contacting the side wall and a portion of the dustproof member contacting the connecting wall are formed continuously.

3. A light scanning apparatus according to claim 1,
wherein a portion of the dustproof member contacting the connecting wall has a plurality of protruding portions each having a protruding shape, and
wherein the plurality of protruding portions are formed along a shape of the distal end of the connecting wall opposed to the plurality of protruding portions.

4. A light scanning apparatus according to claim 3, wherein an interval between adjacent protruding portions of the plurality of protruding portions is smaller than a width in a transversal direction of the connecting wall opposed to the plurality of protruding portions.

5. A light scanning apparatus according to claim 3, wherein the cable is pressed toward the distal end of the connecting wall by the plurality of protruding portions.

6. A light scanning apparatus according to claim 1, wherein the dustproof member comprises an elastic member.

7. A light scanning apparatus according to claim 1, further comprising a regulating portion configured to regulate a laying of the cable passing the distal end,
wherein the regulating portion is provided on a side, which is opposite to the connecting wall, of the side wall.

8. A light scanning apparatus according to claim 7, wherein the regulating portion is formed on the side wall on a side closer toward the bottom portion of the optical box than the distal end.

9. A light scanning apparatus according to claim 8, wherein the regulating portion is formed on the side wall on a side closer toward the bottom portion of the optical box than the base portion of the concave-shaped cut-away portion.

10. A light scanning apparatus according to claim 1,
wherein the cover has an engaging portion configured to engage with the optical box when the cover is mounted to the optical box, and
wherein the connecting wall and the engaging portion overlap with each other through the side wall in a direction along the side wall.

11. A light scanning apparatus according to claim 10,
wherein the side wall has a first side wall provided with the concave-shaped cut-away portion and a second side wall provided with an engaged portion to be engaged with the engaging portion when the cover is mounted, and
wherein the first side wall is formed on an inner side of the optical box than the second side wall.

12. An image forming apparatus, comprising:
a photosensitive member;
a light scanning apparatus configured to emit a light beam so that the light beam scans the photosensitive member to form an electrostatic latent image on the photosensitive member;
a developing unit configured to develop the electrostatic latent image formed by the light scanning apparatus to form a toner image; and
a transfer unit configured to transfer the toner image formed by the developing unit onto a recording medium,
the light scanning apparatus including:
a light source configured to emit the light beam;
a deflector configured to deflect the light beam emitted from the light source;
an optical member configured to guide the deflected light beam to the photosensitive member;
an optical box, which the light source is mounted to, configured to hold the deflector and the optical member in an inside of the optical box; and
a cover configured to cover an opening of the optical box,
the optical box including:
a concave-shaped cut-away portion formed from a top portion of a side wall of the optical box toward a bottom portion of the optical box; and
a connecting wall which stands from the bottom portion of the optical box and is bent and branched from the concave-shaped cut-away portion of the side wall to the inside of the optical box so as to cross over the concave-shaped cut-away portion,
the cover including a dustproof member provided on the cover to dustproof the inside of the optical box, the dustproof member being sandwiched between the cover and the side wall and between the cover and the connecting wall which a cable configured to connect a member arranged inside the optical box and a member arranged outside the optical box passes when the cover is mounted on the optical box,
wherein a height of a distal end of the connecting wall, which the cable passes, from the bottom portion is larger than a height of a base portion of the concave-shaped cut-away portion from the bottom portion.

13. A light scanning apparatus, comprising:
a light source configured to emit a light beam;
a deflector configured to deflect the light beam emitted from the light source;
a driving motor configured to drive the deflector;
an optical member configured to guide the deflected light beam to a photosensitive member;
an optical box, which the light source is mounted to, configured to hold the deflector, the optical member, and the driving motor in an inside of the optical box;
a signal wire configured to electrically connect an outside of the optical box with the driving motor in the inside of the optical box in order to send a signal for driving the driving motor from an exterior of the optical box to the driving motor;
a cover mounted to the optical box to close an opening of the optical box; and
a seal member molded, on the cover, from a material which is elastically deformable compared with the cover, the seal member being elastically deformed by intervening between the optical box and the cover in order to fill a space between the optical box and the cover mounted to the optical box, the signal wire being pressed toward the optical box by an elastic force generated by an elastic deformation of the seal member so that the signal wire is sandwiched between the seal member and the optical box.

14. A light scanning apparatus according to claim 13, wherein the optical box comprises: a bottom portion on which the deflector, the optical member, and the driving motor are mounted; and a side wall standing from the bottom portion and surrounding the deflector, the optical member, and the driving motor, and
wherein the seal member is sandwiched between the cover and a top of the side wall of the optical box so as to be elastically deformed to fill the space between the cover and the optical box.

15. A light scanning apparatus according to claim 14, wherein the seal member is injected so as to be molded on the cover along the top of the side wall in a state in which the cover is mounted on the optical box.

16. A light scanning apparatus according to claim 14, wherein the side wall is provided with a cut-away portion,
wherein the signal wire crosses over the cut-away portion to electrically connect the outside of the optical box with the driving motor in the inside of the optical box,
wherein the side wall comprises a connecting wall connecting a side wall on one end with respect to the cut-away portion with a side wall on the other end, and
wherein the seal member comprises a pressing portion pressing the signal wire against a top of the connecting wall to interpose the signal wire between the top of the connecting wall and the pressing portion.

17. A light scanning apparatus according to claim 14, wherein the signal wire comprises a plurality of signal wires, and
wherein the plurality of signal wires are pressed against the optical box by the seal member along the side wall without intersecting with each other between the seal member and the optical box.

18. A light scanning apparatus according to claim 14, further comprising an outer wall standing from the bottom portion of the optical box and surrounding the side wall,
wherein the signal wire is laid in a space between the side wall and the outer wall, and the signal wire crosses over the outer wall.

19. A light scanning apparatus according to claim 16, wherein in a direction in which the side wall stands, a distance from a root of the side wall to the top of the connecting wall is longer than a distance from the root of the side wall to a base portion of the cut-away portion.

20. An image forming apparatus, comprising:
a photosensitive member;
a light scanning apparatus configured to emit a light beam so that the light beam scans the photosensitive member to form an electrostatic latent image on the photosensitive member;
a developing unit configured to develop the electrostatic latent image formed by the light scanning apparatus to form a toner image; and
a transfer unit configured to transfer the toner image formed by the developing unit onto a recording medium,
the light scanning apparatus including:
a light source configured to emit a light beam;
a deflector configured to deflect the light beam emitted from the light source;
a driving motor configured to drive the deflector;
an optical member configured to guide the deflected light beam to the photosensitive member;
an optical box, which the light source is mounted to, configured to hold the deflector, the optical member, and the driving motor in an inside of the optical box;
a signal wire configured to electrically connect an outside of the optical box with the driving motor in the inside of the optical box in order to send a signal for driving the driving motor from an exterior of the optical box to the driving motor;
a cover mounted to the optical box to close an opening of the optical box; and
a seal member molded, on the cover, from a material which is elastically deformable compared with the cover, the seal member being elastically deformed by intervening between the optical box and the cover in order to fill a space between the optical box and the cover mounted to the optical box, the signal wire being pressed toward the optical box by an elastic force generated by an elastic deformation of the seal member so that the signal wire is sandwiched between the seal member and the optical box.

* * * * *